T. W. HARDY.
HORSE COLLAR FASTENER.
APPLICATION FILED APR. 29, 1908.
923,515.
Patented June 1, 1909.
2 SHEETS—SHEET 1.
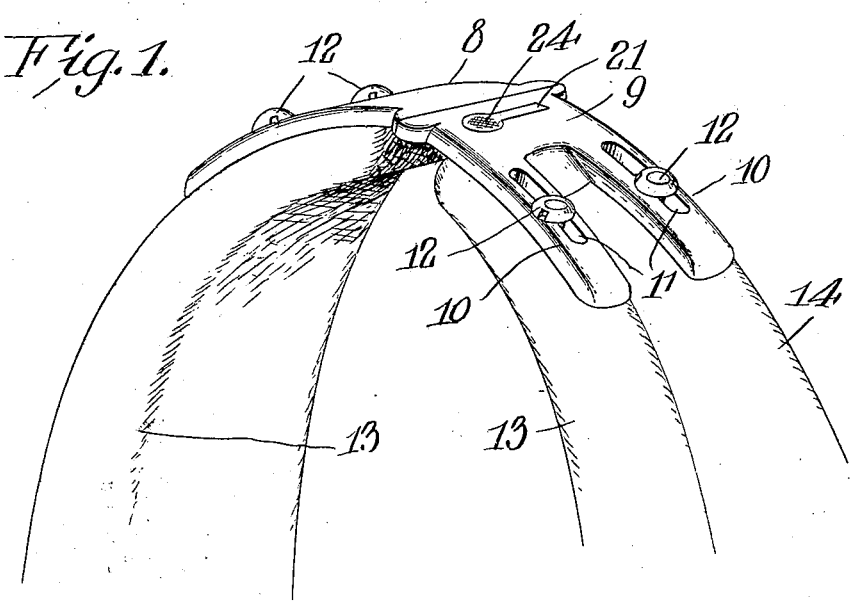
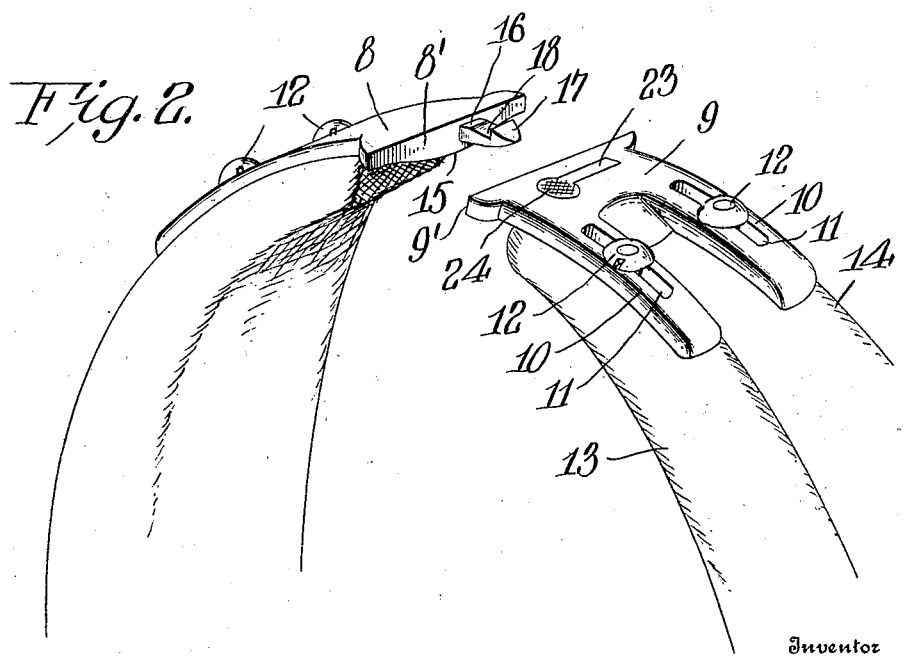
Witnesses
C. E. Smith.
Fenton S. Belt
Inventor
Thomas W. Hardy,
By Wm. Bagger & Co.
Attorneys T. W. HARDY.
HORSE COLLAR FASTENER.
APPLICATION FILED APR. 29, 1908.
923,515.
Patented June 1, 1909.
2 SHEETS—SHEET 2.
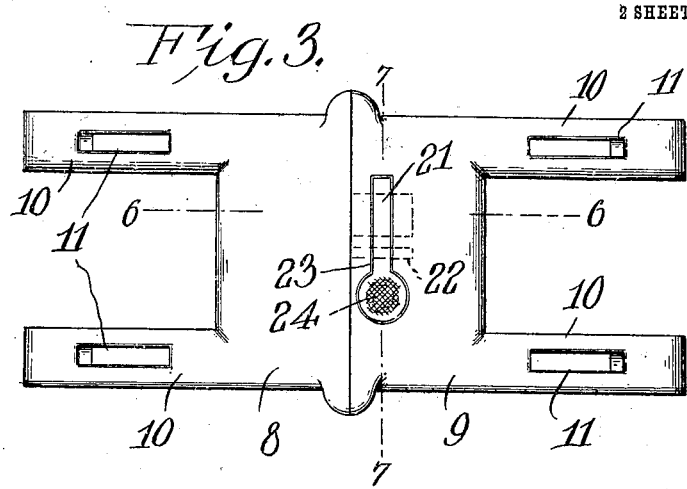
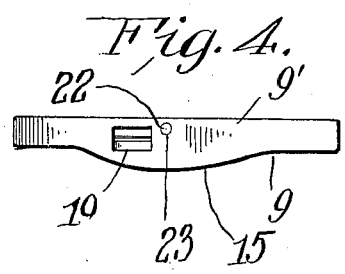
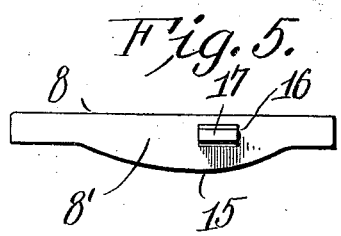
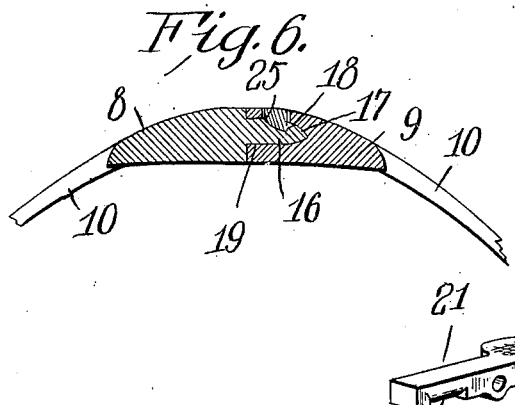
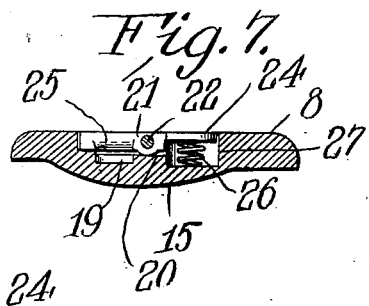
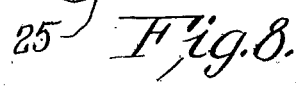
Witnesses
C. E. Smith,
Fenton S. Belt
Inventor
Thomas W. Hardy.
By Wm. Bagger & Co.
Attorneys.

UNITED STATES PATENT OFFICE.

THOMAS W. HARDY, OF SUTTER, ILLINOIS.

HORSE-COLLAR FASTENER.

No. 923,515.     Specification of Letters Patent.     Patented June 1, 1909.

Application filed April 29, 1908. Serial No. 429,894.

*To all whom it may concern:*

Be it known that I, THOMAS W. HARDY, a citizen of the United States, residing at Sutter, in the county of Hancock and State of Illinois, have invented certain new and useful Improvements in Horse-Collar Fasteners, of which the following is a specification.

This invention relates to fastening devices for horse-collars; that is to say, the fastening means whereby the meeting ends of a horse-collar may be secured together for the purpose of securing the collar upon the neck of the animal.

The invention has for its objects to simplify and improve the construction and operation of this class of devices; to provide a collar fastening which shall admit of the ends of the collar being connected very quickly and efficiently by means of a spring actuated snap; to provide a collar fastening which shall be destitute of projections of any kind that would be apt to catch in the lines or other parts of the harness; to provide a collar-fastener which shall admit of the meeting ends of the collar being very quickly and readily separated to enable the collar to be removed from the neck of the animal; to provide a device which shall possess superior advantages in point of simplicity, durability and general efficiency.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being however understood that no limitation is necessarily made to the precise structural details therein exhibited, but that changes, alterations and modifications within the scope of the invention may be resorted to when desired.

In the drawings—Figure 1 is a perspective view, showing the improved fastening device applied to the upper end of a horse-collar. Fig. 2 is a similar view, showing the parts separated. Fig. 3 is a top plan view of the fastening device, detached. Figs. 4 and 5 are side elevations, showing the meeting edges of the two members of the improved fastening device. Fig. 6 is a transverse sectional view, taken on the plane indicated by the line 6—6, Fig. 3. Fig. 7 is a sectional view taken on the plane indicated by the line 7—7, Fig. 3. Fig. 8 is a perspective detail view of the latch-lever.

Corresponding parts in the several figures are denoted by like characters of reference.

The plates or castings 8 and 9, which constitute the component members of the improved fastening device having relatively flat, smooth upper surfaces, and, are provided with arms 10, 10, having slots 11 for the passage of attaching means, such as bolts 12, whereby they are secured adjustably upon the rolls 13, 14, of an ordinary horse-collar adjacent to the free ends of the same. Owing to the presence of the slots 11 in the arms 10, it is obvious that the members of the fastening device may be adjusted upon the collar, so as to fit the latter to the necks of animals of different sizes.

The plates or castings 8 and 9 are formed with broad meeting edges 8' and 9', adapted to abut upon each other, and said plates are formed with downward swells 15 adapted to fit between the rolls of the collar so as to make a smooth finish, which will avoid chafing the neck of the animal, and also to afford convenient supports and housings for the connecting means to be presently described. One of the plates, 8, is provided with a laterally-extending catch 16, projecting from the swelled portion of the meeting edge thereof; said catch being beveled at its outer end, as shown at 17, and provided with a notch 18 in the upper side thereof; the swelled portion of the meeting edge 9' of the plate 9 is provided with a socket or recess 19 for the reception of the catch 16; said socket being transversely intersected by a recess 20, which is formed in the upper side of the plate 9; said recess being for the accommodation of a latch-lever 21 fulcrumed upon a pin 22, which is inserted into an aperture 23 drilled from the meeting edge of the plate 9. The latch lever 21 has at one end a thumb-piece 24, and it is provided near its opposite end with a beveled tooth 25 projecting into the recess 19, so as to ride in the path of the beveled notched catch 16, when the latter enters into the recesses. The latch-lever 21 is actuated by a spring 26 disposed beneath the thumb-piece 24; the recess 20 being enlarged to form a socket 27 for the accommodation of said spring.

It will be observed that the latch-lever 21 normally lies flush with the outer surface of the plate or casting which constitutes the housing in which it is mounted; it will thus be impossible for said lever to be caught in, and accidentally actuated by, parts of the harness; at the same time it is obvious that a light pressure by the thumb or finger of the operator will be sufficient to rock the latch-lever upon its fulcrum, thus disengaging the tooth 25 from the notched catch 16, thus permitting the members of the fastening device and the meeting ends of the collar to be separated; when, on the other hand, the parts are brought together, the notched catch will enter into the recess 19, where it will be engaged by the tooth 25 of the spring-actuated latch lever, which will close upon it with a snap, thus instantly connecting the parts.

The improved fastening device is simple in construction, neat in appearance, and thoroughly efficient for the purposes for which it is provided.

The swelled portions of the plates or members of the improved fastening device not only adapt said plates to fit smoothly and snugly between the rolls of the horse collar, but they also afford housings and supports for the connecting means for said plates or members, thus enabling the upper, exposed faces of said plates or members to be left perfectly smooth and free from projections which would be liable to become entangled with parts of the harness; this construction it will be seen is not only conducive to neatness of appearance, but equally to the mechanical perfection of the device. The ends of the collar may be readily connected when the collar is not in use, thus enabling the collar to preserve its shape when suspended upon a nail or peg.

Having thus described my invention, I claim and desire to secure by Letters Patent of the United States:—

1. A horse-collar fastener comprising two separate plates or members, having flat, smooth upper surfaces and slotted attaching arms, broad meeting edges and downward swells adapted to fit between the rolls of a horse-collar, said plates being equipped with interengaging connecting means supported on and housed in the swelled portions of the plates.

2. A horse-collar fastener comprising two separate plates or members having slotted attaching arms, downward swells and broad meeting edges; one of said plates being provided with a beveled notched catch projecting from the swelled portion of the meeting edge thereof and the other member being provided in its swelled portion with a socket for the reception of said catch, and with a recess in its upper surface intersecting said socket; and a latch-lever fulcrumed in said recess and having a beveled tooth projecting into the socket in the path of the notched catch.

3. A horse-collar fastener comprising two separate plates adjustably secured upon the meeting ends of the collar; said plates having smooth unobstructed upper surfaces and provided with downwardly swelled portions fitting between the rolls of the collar and affording supports and housings one of said plates being provided upon the downwardly swelled portion of its meeting edge with a laterally projecting beveled notched catch, and the other member being provided in the downwardly swelled portion of its meeting edge with a socket for the reception of said catch and with a recess in its upper surface intersecting said socket; a fulcrum-pin extending from the edge of the plate through the recess; a latch-lever pivoted upon the pin and lying normally flush with the exterior surface of the plate, said latch-lever being provided at one end with a thumb-piece and adjacent to its other end with a beveled tooth projecting into the socket in the path of the notched catch; and an actuating spring beneath the thumb-piece of the lever.

In testimony whereof I affix my signature in presence of two witnesses.

THOMAS W. HARDY.

Witnesses:
  M. T. CHENOWETH,
  ALBERT LEMMON.